(12) United States Patent
Laws et al.

(10) Patent No.: US 10,551,515 B2
(45) Date of Patent: Feb. 4, 2020

(54) DETERMINING AN INTERVAL BETWEEN ACTIVATIONS OF AT LEAST ONE SURVEY SOURCE

(71) Applicant: WESTERNGECO, L.L.C., Houston, TX (US)

(72) Inventors: Robert Laws, Cambridge (GB); Claudio Bagaini, Asker (NO); Ralf Ferber, Horsham (GB)

(*) Notice: Subject to any disclaimer, the term of this patent is extended or adjusted under 35 U.S.C. 154(b) by 1527 days.

(21) Appl. No.: 14/445,095

(22) Filed: Jul. 29, 2014

(65) Prior Publication Data

US 2015/0039236 A1    Feb. 5, 2015

Related U.S. Application Data

(60) Provisional application No. 61/859,841, filed on Jul. 30, 2013.

(51) Int. Cl.
    *G01V 1/00*    (2006.01)

(52) U.S. Cl.
    CPC .................. *G01V 1/003* (2013.01)

(58) Field of Classification Search
    USPC .......................................... 702/14
    See application file for complete search history.

(56) References Cited

U.S. PATENT DOCUMENTS

| 2010/0008184 A1 | 1/2010 | Hegna et al. | |
|---|---|---|---|
| 2011/0002193 A1 | 1/2011 | Storteig et al. | |
| 2011/0158044 A1* | 6/2011 | Moldoveanu | G01V 1/3808 367/20 |
| 2012/0033525 A1* | 2/2012 | Abma | G01V 1/3808 367/20 |
| 2012/0081998 A1 | 4/2012 | Almaas et al. | |
| 2012/0147699 A1* | 6/2012 | Dellinger | G01V 1/005 367/15 |
| 2012/0176861 A1* | 7/2012 | Abma | G01V 1/005 367/21 |
| 2012/0314536 A1* | 12/2012 | Bagaini | G01V 1/3808 367/20 |
| 2013/0155810 A1 | 6/2013 | Dowle | |
| 2013/0235697 A1* | 9/2013 | Szydlik | G01V 1/282 367/73 |
| 2014/0198607 A1* | 7/2014 | Etienne | G01V 1/3852 367/15 |
| 2014/0241117 A1* | 8/2014 | Dellinger | G01V 1/3808 367/15 |
| 2014/0269169 A1* | 9/2014 | van Borselen | G01V 1/3861 367/15 |

OTHER PUBLICATIONS

International search report and written opinion for the equivalent PCT patent application No. PCT/US2014/048815 dated Nov. 10, 2014.

* cited by examiner

*Primary Examiner* — Ricky Ngon

(57) ABSTRACT

A shot interval between activations of at least one frequency-controllable survey source is determined, where the shot interval is determined based on an expected frequency of an output of the at least one frequency-controllable survey source. The at least one frequency-controllable survey source is activated using the determined first shot interval.

15 Claims, 5 Drawing Sheets

DETERMINING AN INTERVAL BETWEEN ACTIVATIONS OF AT LEAST ONE SURVEY SOURCE

CROSS-REFERENCE TO RELATED APPLICATION

This application claims the benefit under 35 U.S.C. § 119(e) of U.S. Provisional Application Ser. No. 61/859,841, entitled "FREQUENCY-DEPENDENT SOURCE GEOMETRY IN MARINE SEISMIC ACQUISITION," filed Jul. 30, 2013, which is hereby incorporated by reference.

BACKGROUND

Seismic surveying is used for identifying subsurface elements, such as hydrocarbon reservoirs, freshwater aquifers, gas injection zones, and so forth. In seismic surveying, seismic sources (such as seismic vibrators or other types of sources) are placed at various locations on a land surface or sea floor or at another location. The seismic sources are activated to generate seismic waves directed into a subsurface structure.

The seismic waves generated by a seismic source travel into the subsurface structure. A portion of the seismic waves are reflected back to the surface for receipt by seismic receivers (e.g. hydrophones, geophones, accelerometers, etc.). These seismic receivers produce signals that represent detected seismic waves. Signals from seismic receivers are processed to yield information about the content and characteristic of the subsurface structure.

SUMMARY

In general, according to some implementations, a shot interval between activations of at least one frequency-controllable survey source is determined, where the shot interval is determined based on an expected frequency of an output of at least one frequency-controllable survey source. The at least one frequency-controllable survey source is activated using the determined first shot interval.

Other or additional features will become apparent from the following description, from the drawings, and from the claims.

BRIEF DESCRIPTION OF THE DRAWINGS

Some implementations are described with respect to the following figures.

DETAILED DESCRIPTION

Figure 1:
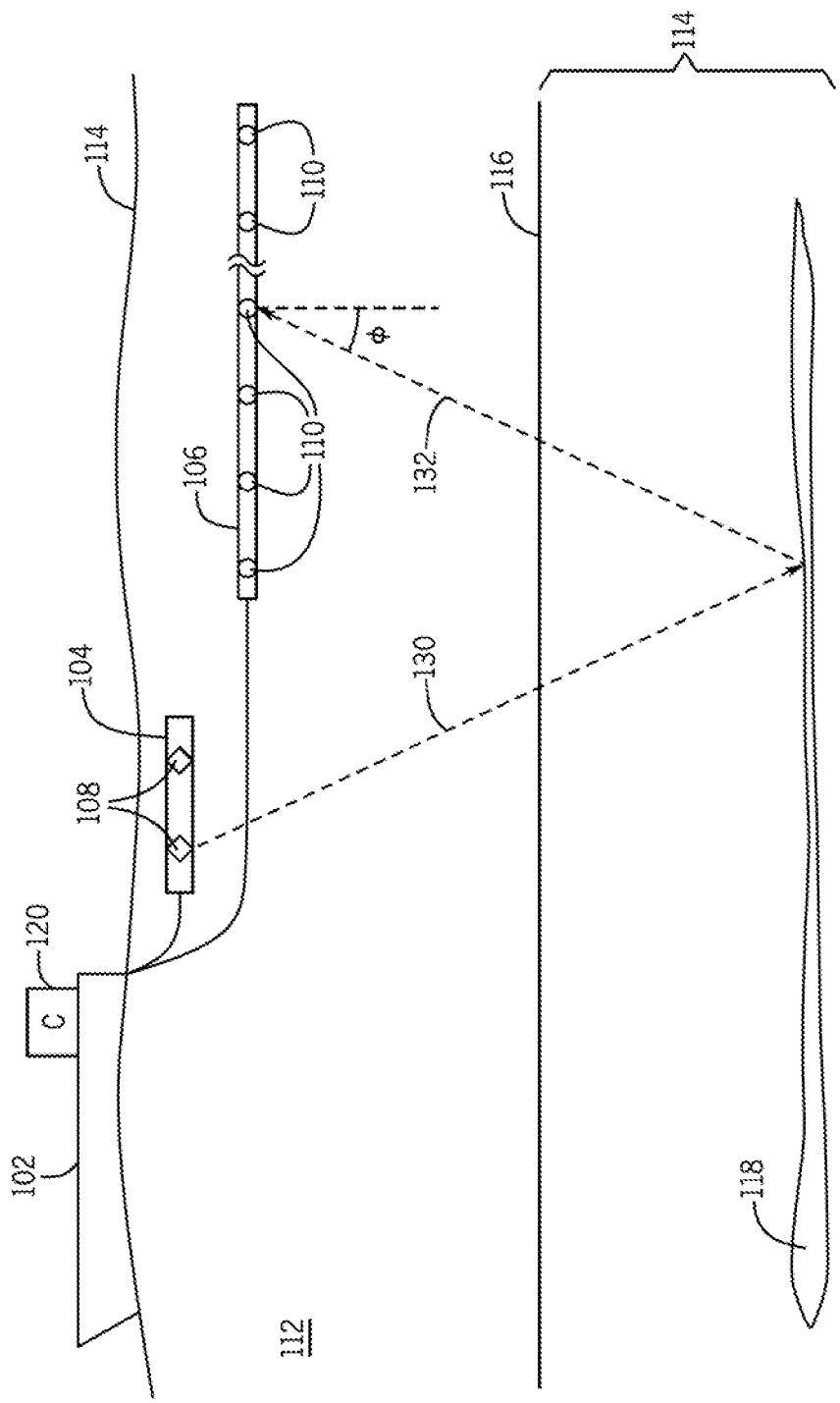
FIG. 1 is a schematic diagram of an example survey arrangement according to some implementations.

In seismic surveying, a seismic source is used to produce seismic signals that are propagated into a subsurface structure. In some implementations, the seismic source can be in the form of a seismic vibrator, which has at least one moveable element that is actuated to oscillate between different positions to cause vibrations that cause production of seismic signals that are propagated into the subsurface structure.

Although reference is made to performing surveying to characterize a subsurface structure, techniques or mechanisms according to some implementations can also be applied to perform surveys of other structures, such as human tissue, a mechanical structure, plant tissue, animal tissue, a solid volume, a substantially solid volume, a liquid volume, a gas volume, a plasma volume, a volume of space near and/or outside the atmosphere of a planet, asteroid, comet, moon, or other body, and so forth. In addition, the following describes seismic sources and seismic receivers that are part of seismic survey equipment. In other implementations, other types of survey equipment can be used, which can include other types of survey sources and survey receivers.

A seismic vibrator is an example of a survey source whose frequency can be controlled. The frequency of an output emitted by the seismic vibrator can be controlled, such that the signal emitted by the output of the seismic vibrator is at a specific frequency (or frequencies). A survey source whose frequency is controllable can be referred to as a frequency-controllable survey source. The signals output by the seismic vibrator can be swept within a specified frequency range, from a first frequency to a second frequency of the frequency range. The signal sweep that is produced by the seismic vibrator may be an oscillating signal of a continuously varying frequency, increasing or decreasing monotonically within a given frequency range. The frequency of the seismic sweep may start low and increase with time (an upsweep) or the frequency may begin high and gradually decrease (a downsweep). To produce the frequency sweep, the control input to the seismic vibrator includes input signals (also referred to as "pilot signals") that sweep across frequencies from a first frequency to a second frequency (the "sweep range"). The input signals (or pilot signals) that are input to the seismic vibrator controls the output frequency of the seismic vibrator.

In a seismic survey arrangement, seismic receivers are arranged to receive signals reflected from a subsurface structure. Data measured by the seismic receivers are transmitted to a processing system to process the measured data to characterize the subsurface structure. For example, the processing system can generate an image of the subsurface structure, or a model of the subsurface structure.

Aliasing can occur in data measured by seismic receivers. Aliasing is an effect that causes different signals to become indistinguishable when sampled. In other words, the different signals that are indistinguishable from each other are aliases of one another.

Aliasing can be caused by successive activations of seismic sources being too far apart from each other. An "activation" of a seismic source can refer to any operation of the seismic source that causes the seismic source to emit a signal having at least one frequency (e.g. a single frequency or a range of frequencies). In some examples, the seismic source can be a continuously-on seismic source, in which case "activation" of the seismic source refers not to turning on the seismic source, but to a control of the seismic source to cause the seismic source to produce the emission. In other examples, "activation" can refer to turning on a seismic source. The interval between activations of seismic sources can be chosen so that the reverberation from a previous activation of seismic sources has time to decay before the next activation of seismic sources. However, if seismic source activations are separated too far apart from each other, then aliasing can occur, which can result in inaccuracies when processing measured data to characterize a subsurface structure.

In accordance with some implementations, to avoid or reduce aliasing, a shot interval between seismic source activations can be selected to satisfy one or more constraints. Note that the shot interval can be expressed in terms of a shot interval time (time between successive seismic source activations) or a shot interval distance (distance between successive seismic source activations). As discussed further below, the one or more constraints can be based on the expected frequency of output of one or more frequency-controllable seismic sources. In some implementations, the expected frequency of output is the dominant frequency (e.g. highest frequency from it range of frequencies) of an emission from the one or more frequency-controllable seismic sources.

FIG. 1 is a schematic diagram of an example seismic survey arrangement that performs seismic surveying in a marine environment. Note that in other examples, a seismic survey arrangement can be used in a land-based seismic survey.

As depicted in FIG. 1, a marine vessel 102 tows a seismic source assembly 104 and a seismic receiver assembly 106. In the example of FIG. 1, the seismic source assembly 104 includes multiple seismic sources 108 that are moving during a survey operation. In a different implementation, the seismic source assembly 104 can include just one seismic source. The seismic receiver assembly 106 can be in the form of a streamer having multiple seismic receivers 110. Although depicted as being towed by one marine vessel 102, it is noted that different marine vessels can tow the seismic source assembly 104 and the seismic receiver assembly 106, respectively. In further examples, multiple seismic source assemblies and/or multiple seismic receiver assemblies can be towed by respective different marine vessels.

The seismic source assembly 104 and seismic receiver assembly 106 are towed through a body of water 112 underneath a water surface 114 (e.g. sea surface). Seismic signals generated by the seismic sources 108 are propagated (along path 130, for example) into a subsurface structure 114 underneath a water bottom surface 116 (e.g., a sea floor). The subsurface structure 114 includes a subsurface element 118 (or multiple subsurface elements) of interest, which can be a hydrocarbon reservoir, a fresh water aquifer, a gas injection zone, and so forth.

Seismic signals reflected from the subsurface structure 114 and propagated along path 132, for example, are detected by the seismic receivers 110 in the seismic receiver assembly 106. The measured data by the seismic receivers 110 are provided for analysis to characterize the content of the subsurface structure 114.

As further depicted in FIG. 1, a controller 120 is provided at the marine vessel 102. The controller 120 can be used to control activation of the seismic sources 108, and also, can be used to receive measured data from the seismic receiver assembly 106. The controller 120 can process the received measured data to characterize the subsurface structure 112, such as by producing an image of the subsurface structure 114, or producing a model of the subsurface structure 114. In other examples, measured data from the seismic receivers 110 can be provided to a remote processing system for processing of the measured data.

Figure 2:
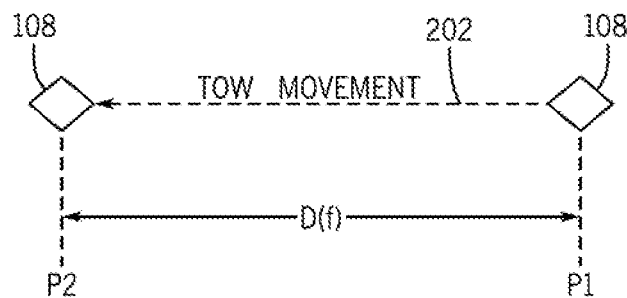
FIG. 2 is a schematic diagram of a shot interval between activations of a survey source, according to some examples.

FIG. 2 depicts an example arrangement that includes a seismic source 108, which in a marine survey arrangement is towed (indicated by arrow 202 in FIG. 2) between a first position P1 and a second position P2. P1 and P2 represent positions at which the seismic source 108 is activated. In other words, P1 and P2 represent positions of the seismic source 108 between successive activations. The distance between positions P1 and P2 is represented as D(f), which is also referred to as the shot interval distance, where f represents a frequency of the output of the frequency-controllable seismic source 108. Note that the shot interval distance, D(f), is based on the shot interval time T(f) (the time between successive activations of the seismic source 108). Since the seismic source 108 is towed at a given speed during a survey operation, the shot interval distance, D(f), is based on the shot interval time, T(f), and the tow speed.

In accordance with some implementations, the selection of a shot interval—shot interval distance, D(f), or shot interval time, T(f)—based on one or more constraints that account for the frequency output of the seismic sources 108. Selection of the shot interval that satisfies the one or more constraints removes or reduces aliasing in data measured by seismic receivers in response to activations of the seismic sources.

If the target frequency of the seismic sources 108 is changed, then the shot interval can be chanced accordingly. Note that the frequency output of the seismic sources 108 can be swept in a sweep frequency range from a first frequency to a second frequency. In such a scenario, the highest frequency of the sweep frequency range is used for purposes of determining the shot interval.

In a land-based survey arrangement, seismic sources may not be moved. In the land-based survey arrangement, multiple seismic sources can be positioned with successive seismic sources being separated by the determined shot interval distance, D(f).

The one or more constraints employed for computing a shot interval are discussed further below.

Figure 3:
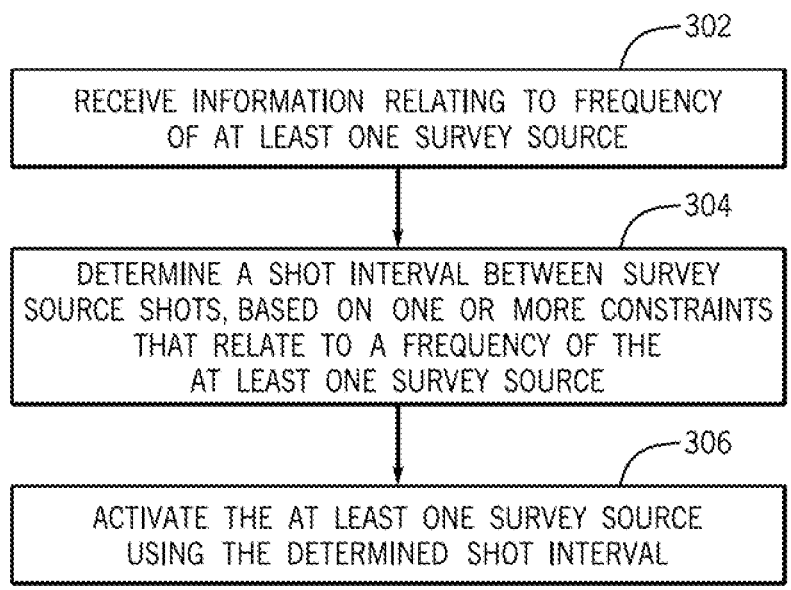
FIG. 3 is a flow diagram of a process according to some implementations.

FIG. 3 is a flow diagram of a process of performing a survey of a target structure, according to some implementations. The process receives (at 302) information relating to a frequency of output of at least one survey source (a frequency-controllable survey source) to be used in a survey operation. The process further determines (at 304) a shot interval (shot interval distance or shot interval time) between the survey source shots (activations of the at least one survey source), based on one or more constraints that relate to the frequency of the at least one survey source, where the determined shot interval between the survey source shots is to reduce or remove aliasing in measured data.

The process then activates (at 306) the at least one survey source using the determined shot interval in a survey arrangement, such as that depicted in FIG. 1, for performing a survey operation with respective to a subsurface structure.

The following describes examples of various constraints used to determine the shot interval distance between survey source shots, according to some implementations. Although reference is made to specific constraints, it is noted that just a subset of the constraints can be used, or in other examples, additional constraints can be used.

To avoid or reduce aliasing, the shot interval distance D(f), which is a function of frequency, f, of operation of at least one survey source, is selected to satisfy the following constraints:

$$D(f) = V\text{boat} * T(f), \qquad \text{Constraint 1}$$

$$T(f) > T\text{decay}(f), \qquad \text{Constraint 2}$$

$$T(f)>TWT,\quad\text{Constraint 3}$$

$$D(f)<C/(2*f).\quad\text{Constraint 4}$$

T(f) is the shot interval in time, and specifies the amount of time between successive shots of at least survey source. TWT is the two-way time to a target element, such as the subsurface element 118 in FIG. 1. The two-way time, TWT, includes the amount of time for a source signal to propagate from a survey source to the target element, and a reflected signal to propagate back from the target element to a survey receiver. Tdecay is the time taken for the reverberation of a survey source at frequency f to fall to an acceptable level (e.g. the amplitude of the source signal has fallen below a specified threshold). Reverberation of a survey source refers to a persistence of a signal (e.g. acoustic energy) created by activation of the survey, where the signal can continue even after the survey source has been deactivated. After deactivation of the survey source, the signal decays.

Vboat is the velocity of a marine vessel (e.g. 102 in FIG. 1) used to tow the survey sources. C is the speed of sound in water.

Constraint 1 relates to movement of the marine vessel that tows a survey arrangement including at least one survey source. Constraint 1 specifies that the shot interval distance, D(f), is equal to the product of the velocity of the marine vessel, Vboat, multiplied by the shot interval time, T(f), between activations of at least one survey source.

Constraint 2 specifies that the shot time interval, T(f) is greater than the time, Tdecay(f), for the reverberation of the output signal produced by a previous survey source shot to decay to a sufficiently low level, i.e. less than a specified threshold. Note that the decay time, Tdecay(f), is based on the frequency of the signal produced by a survey source. The decay time is longer at lower frequencies, but shorter at higher frequencies.

Constraint 3 specifies that the shot time interval, T(f), is greater than the two-way time, TWF, of signals between the survey arrangement and a target element in the subsurface structure.

Constraint 4 specifies that the shot interval distance, D(f), is less than C/(2*f), which avoids aliasing.

Using constraints 1-4, the shot interval time, T(f), can be determined. From the shot interval time, the shot interval distance, D(f), can be determined according to constraint 1. The range of values for which the constraints are solved can depend on the expected bandwidth of an image or other output of processing of the measured data.

In other examples, constraint 4 may be relaxed by making use of the expected range of arrival angles of seismic signals. Constraint 4 can be written as $$D(f)<C/(2*f*\sin(\phi)),$$

where ϕ is the incidence angle of seismic signals on a survey receiver, measured from the normal to a surface of a streamer carrying the survey receiver (depicted in FIG. 1).

Constraint 3 may be omitted if data processing can be applied to remove the output signal of a survey source from the measured data.

Figure 4:
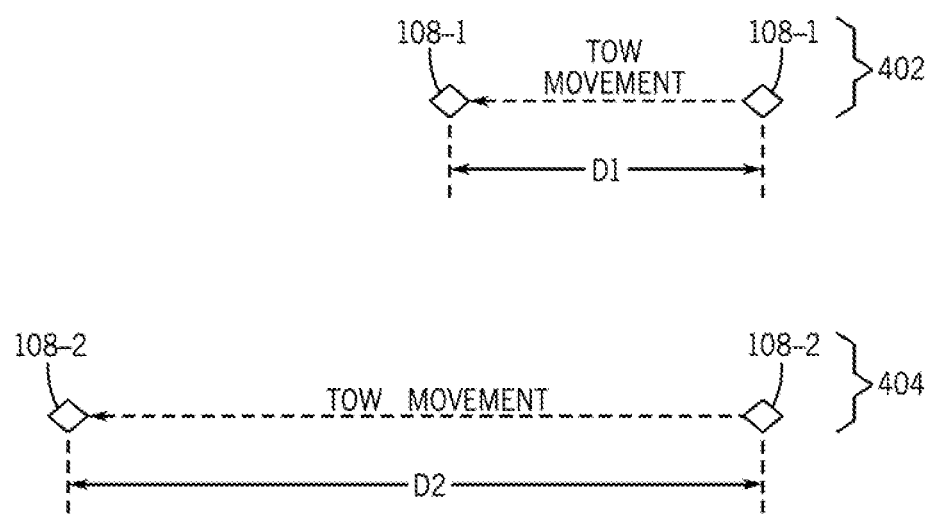
FIG. 4 is a schematic diagram of shot intervals between activations of survey sources for different frequency ranges, according to some examples.

In some implementations, different sets of survey sources can be employed for different sweep frequency ranges. For example, as shown in FIG. 4, two survey source sets 402 and 404 of survey sources 108 are depicted. The first survey source set 402 includes at least one survey source 108-1, and the second survey source set 404 includes at least one survey source 108-2. The first survey source set 402 is used for a first sweep frequency range, and the second survey source set 402 is used for a second sweep frequency range that is different from the first sweep frequency range. For example, the second survey source set 404 can be used for a lower sweep frequency range (e.g. including frequencies less than 15 Hertz or Hz) The first survey source set 402 can be used for a higher sweep frequency range (e.g. 15 Hz<f<60 Hz), As shown in FIG. 4, the shot interval distance D1 between successive survey source activations of the first survey source set 402 is less than the shot interval distance D2 between survey source activations of the second survey source set 404.

The first and second survey source sets 402 and 404 can be deployed at different depths chosen to suit their particular sweep frequency ranges. For example, a survey source set for a lower sweep frequency range can be arranged to be deeper in a body of water than another survey source set for a higher sweep frequency range.

In further examples, the survey sources in the different survey source sets can be of different types to suit their particular sweep frequency ranges. For example, a survey source for lower frequency operation can be implemented as a hydraulic vibrator, whereas a survey source for higher frequency operation can be implemented as a flex-tensional vibrator (which has a flexible outer shell that changes volume during operation).

The foregoing examples refer to use of different survey source sets 402 and 404 to sweep through respective different frequency ranges. In other examples, a survey source set of one or more survey sources can be used to emit signals of different frequency ranges. For example, the survey source set can emit a sweep, [A(t)+B(t)], where A(t) is swept from f1 to f2, repeating every T1 time interval (first shot interval), while B(t) is swept from f3 to f4 (f3 and/or f4 different from f1 and/or f2), repeating every T2 (T2 different from T1) time interval (second shot interval).

In further implementations, measurement data sampled on multiple circularly shifted time grids can be provided, by applying circular time shifts to activations of at least one seismic source. More specifically, the circular time shifts can be applied to a pilot signal that is used to control a seismic vibrator.

Circularly shifting a sequence that makes up a pilot signal refers to shifting samples of the sequence by a specific amount in a given direction, with the samples at the end of the sequence that are shifted out being provided to the other end of the sequence. For example, assume a sequence [a b c d e] represents a pilot signal. A forward circular shift of one sample to the sequence results in the shifted sequence [e a b c d]. Another forward circular shift of the shifted sample results in the further shifted sequence [d e a b c].

Figure 5:
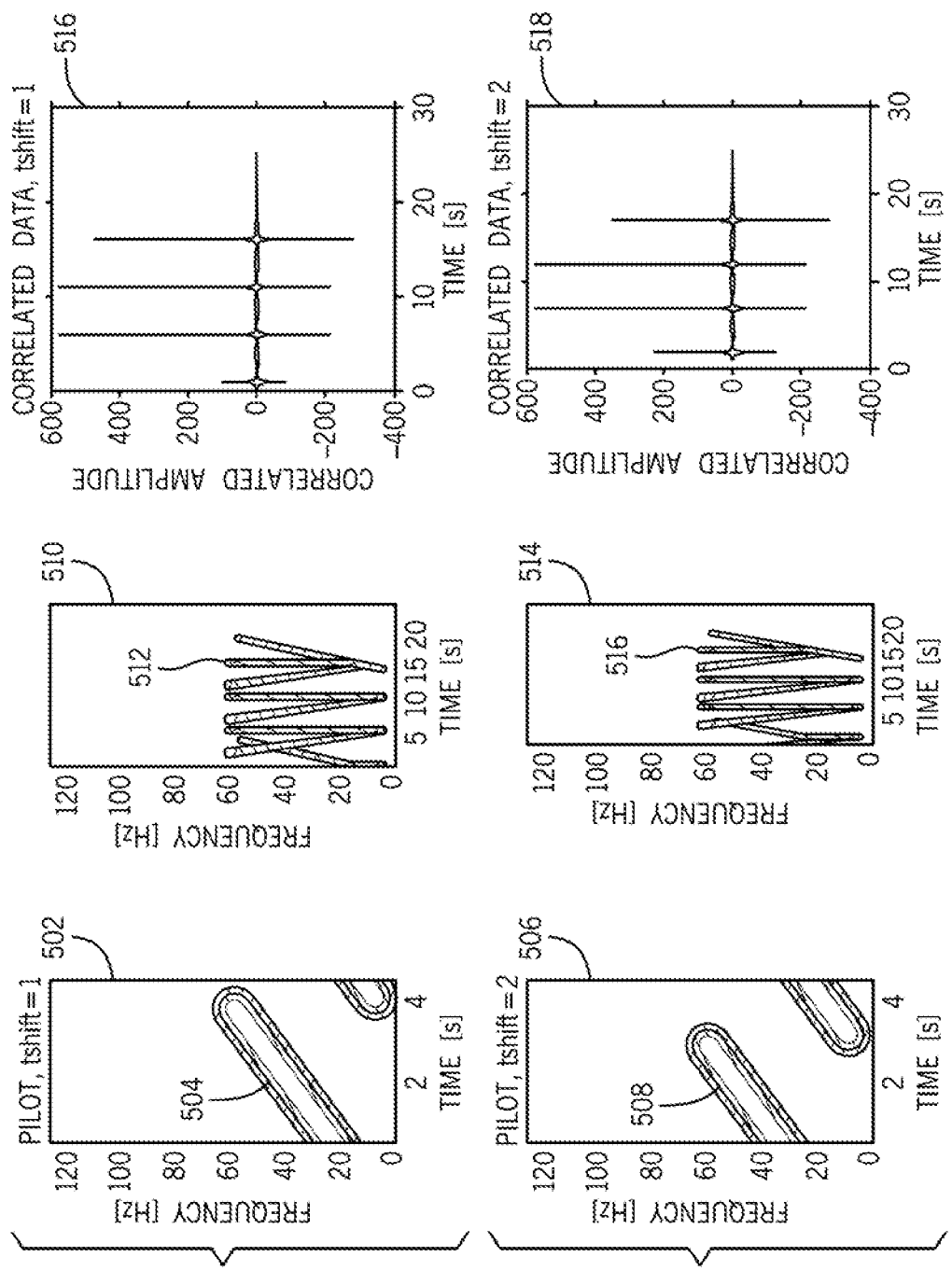
FIGS. 5A-5B are example graphs showing circular time sweeps of a pilot signal and correlation of measured data with the circularly time shifted pilot signal sweeps, according to further implementations.

FIG. 5A shows a time-frequency graph 502 including a representation 504 of a pilot signal that has been circularly shifted by 1 second, for example. FIG. 5B shows a time-frequency graph 506 including a representation 508 of the pilot signal that has been circularly shifted by 2 seconds. More specifically, the representation 504 of FIG. 5A is of a pilot signal sweep that has been circularly shifted by 1 second, while the representation 508 of FIG. 5B is of a pilot signal sweep that has been circularly shifted by 2 seconds.

Measured data, as acquired by seismic receivers, can be correlated with the circularly shifted sweeps. A time-frequency graph 510 in FIG. 5A shows a representation 512 of a result produced by correlating the measured data with the 1-second circularly shifted pilot signal sweep, and a time-frequency graph 514 in FIG. 5B shows a representation 516 of a result produced by correlating the measured data with the 2-second circularly shifted pilot signal sweep.

Time-amplitude graphs 516 and 518 show the correlated data in the time-amplitude domain.

Each circularly shifted time grid provides a re-sampling of contiguous records at locations different than the location where a sweep segment started.

In additional implementations, frequencies of a sweep frequency range are emitted at the same time by using a continuous seismic source A continuous seismic source produces a continuous seismic signal that has content over a predefined frequency bandwidth. As an example, a continuous seismic signal can be produced by using a pseudorandom sweep. In some examples, two or more pseudorandom sweeps are designed to cover two or more respective different frequency ranges. The continuous sources can be deployed at different depths such that the water surface (e.g. sea surface) generates a constructive interference for the central frequency of each of the individual pseudorandom sweeps.

Figure 6:
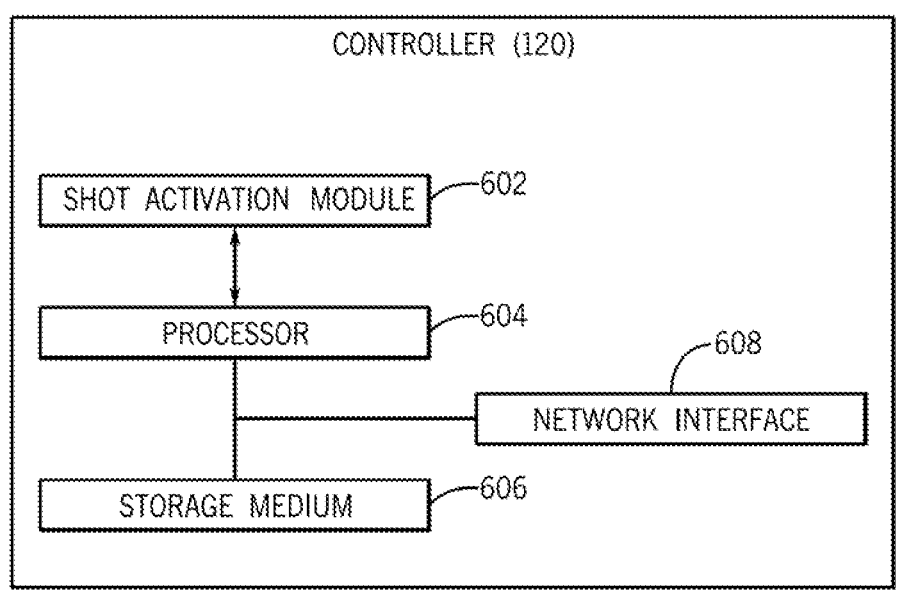
FIG. 6 is a block diagram of an example controller, according to some examples.

FIG. 6 illustrates an example controller 120 according to some implementations. The controller 120 can be used to determine a shot interval between seismic source shots, based on various constraints as discussed above. The controller 120 can also activate at least one seismic source using the determined shot interval, such as in a process according to FIG. 3.

The controller 120 includes a shot activation module 602 for performing the foregoing tasks, such as according to FIG. 3. The shot activation module 602 can be implemented as machine-readable instructions executable on one or multiple processors 604. The controller 120 can be implemented with a computer system or with a distributed arrangement of computer systems. A processor can include a microprocessor, microcontroller system, processor module or subsystem, programmable integrated circuit, programmable gate array, or another control or computing device.

The processor(s) 604 is (are) connected to a storage medium (or storage media) 606. The controller 120 also includes a network interface 60 to allow the controller 120 to communicate with another system.

The storage medium (or storage media) 606 can be implemented as one or more non-transitory computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of surveying a target structure, comprising:
   determining a first shot interval between activations of at least one frequency-controllable survey source, the first shot interval determined based on an expected frequency of an output of the at least one frequency-controllable survey source; and
   activating the at least one frequency-controllable survey source using the determined first shot interval, wherein the first shot interval is determined based on constraints relating to:
   a time of decay of a signal produced by the frequency-controllable survey source; and,
   avoiding aliasing in signals measured by at least one survey receiver in response to the activations of at least one frequency-controllable survey source.

2. The method of claim 1, wherein the first shot interval includes one of a shot interval time between the activations of the at least one frequency-controllable survey source, or a shot interval distance between the activations of the at least one frequency-controllable survey source.

3. The method of claim 1, wherein the constraint of avoiding aliasing is according to a speed of sound in a medium through which the signals due to the activations of at least one frequency controllable survey source propagate, and according to the frequency of output of the at least one frequency-controllable survey source.

4. The method of claim 1, wherein the first shot interval is determined based on a constraint relating to a time for signals to travel from the frequency-controllable survey source to an element in the target structure, and to travel from the element in the target structure to at least one survey receiver.

5. The method of claim 1, wherein the at least one frequency-controllable survey source is part of a first source array used for outputting signals in a first frequency range, the method further comprising:
   using a second source array including at least one frequency-controllable survey source fix outputting signals in a second, different frequency range, wherein using the second source array comprises:
   determining a second shot interval between activations of the at least one frequency-controllable survey source of the second source array, the second shot interval determined based on an expected frequency of an output of the at least one frequency controllable survey source of the second source array, the second shot interval different from the first shot interval; and
   activating the at least on frequency-controllable survey source of the second source array using the determined second shot interval.

6. The method of claim 5, further comprising: arranging the first source array at a first depth in a body of water that is different from a second depth in the body of water at which the second source array is arranged.

7. The method of claim 6, wherein the at least one frequency-controllable survey source of the first source array is of a type different from the at least one frequency controllable survey source of the second source array.

8. The method of claim 1, wherein activating the at least one frequency-controllable survey source using the determined first shot interval comprises activating the at least one frequency-controllable survey source to emit in a first frequency range, the method further comprising:

determining a second shot interval between activations of the at least one frequency controllable survey source for emissions in a second different frequency range, the second shot interval determined based on an expected frequency of an output of the at least one frequency controllable survey source in the second frequency range; and activating the at least one frequency-controllable survey source using the determined second shot interval to emit in the second frequency range.

9. The method of claim 1, wherein the at least one frequency-controllable survey source is a continuous survey source.

10. The method of claim 1, further comprising:

applying circular time shifts to a pilot signal for controlling the at least one frequency controllable survey source; and correlating measured data with the circularly time shifted pilot signal.

11. The method of claim 10, further comprising generating one or more datasets sampled on multiple circularly shifted time grids.

12. A system comprising:

at least one processor configured to:

determine a first shot interval between activations of at least one frequency controllable survey source to survey a target structure, the first shot interval determined based on an expected frequency of an output of the at least one frequency-controllable survey source; and activate the at least one frequency-controllable survey source using the determined first shot interval, wherein the first shot interval is determined based on constraints relating to:

a time for signals to travel from the frequency-controllable survey source to an element in the target structure, and to travel from the element in the target structure to at least one survey receiver; and, avoiding aliasing in signals measured by at least one survey receiver in response to the activations of at least one frequency-controllable survey source.

13. The system of claim 12, wherein the first shot interval is determined based on a constraint relating to a time of decay of a signal produced by the frequency-controllable survey source.

14. The system of claim 12, wherein the at least one frequency-controllable survey source is part of a first source array used for outputting signals in a first frequency range, wherein the at least one processor is to control a second source array including at least one frequency-controllable survey source for outputting signals in a second, different frequency range, wherein controlling the second source array comprises:

determining a second shot interval between activations of the at least one frequency-controllable survey source of the second source array, the second shot interval determined based on an expected frequency of an output of the at least one frequency controllable survey source of the second source array, the second shot interval different from the first shot interval; and activating the at least one frequency-controllable survey source of the second source array using the determined second shot interval.

15. An article comprising at least one non-transitory machine-readable storage medium storing instructions that upon execution cause a system to:

determine a shot interval between activations of at least one frequency-controllable survey source, the shot interval determined based on an expected frequency of an output of the at least one frequency-controllable survey source; and activate the at least one frequency-controllable survey source using the determined shot interval, wherein the shot interval is determined based on a constraint to avoid aliasing in signals measured by at least one survey receiver in response to the activations of at least one frequency controllable survey source.

* * * * *